May 4, 1965 J. BAJER 3,181,850
VIBRATION ISOLATING DEVICE
Filed Dec. 20, 1962 2 Sheets-Sheet 1
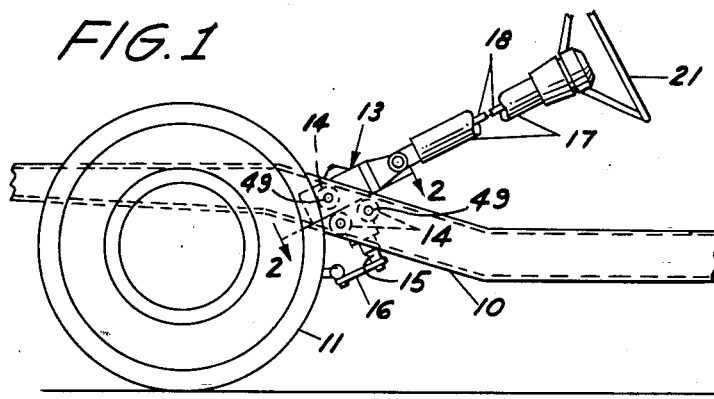
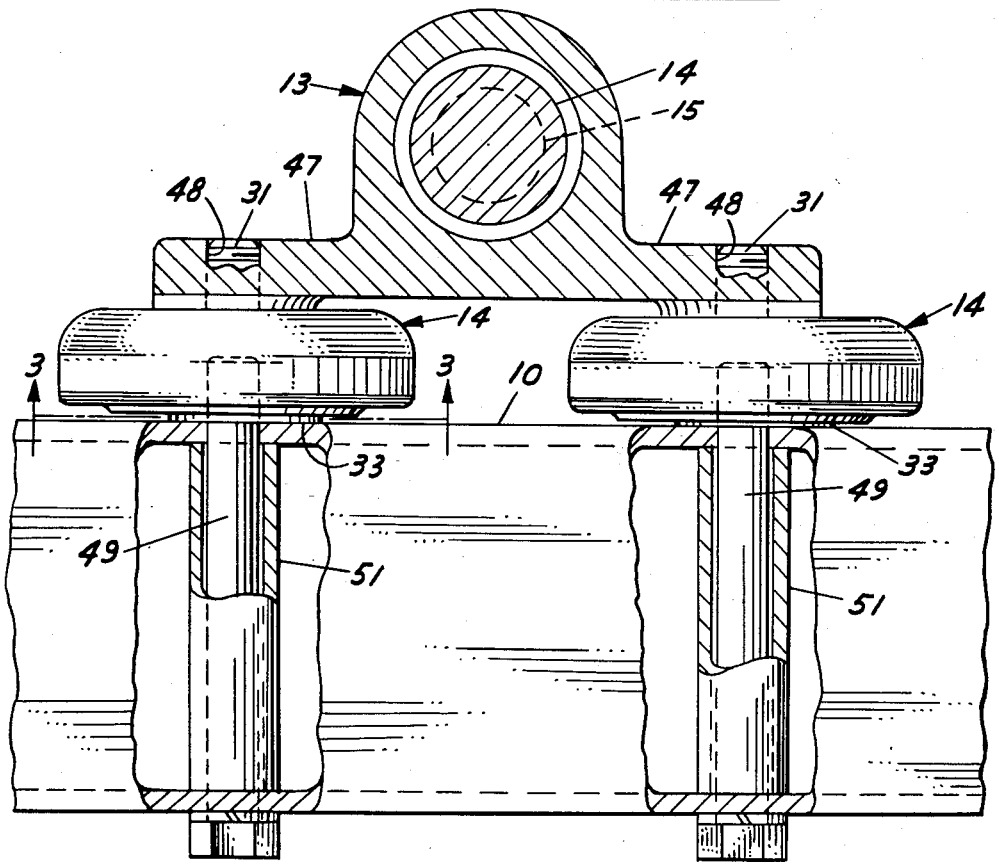
INVENTOR.
JACQUES BAJER
BY John R. Faulkner
Keith L. Zerschling
ATTORNEYS

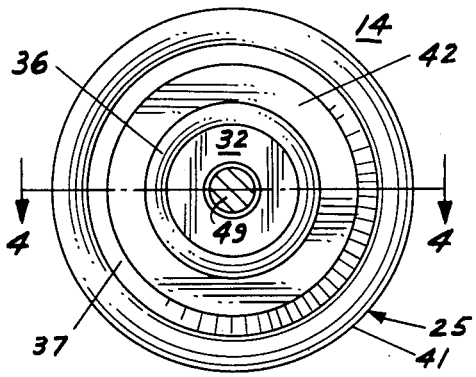
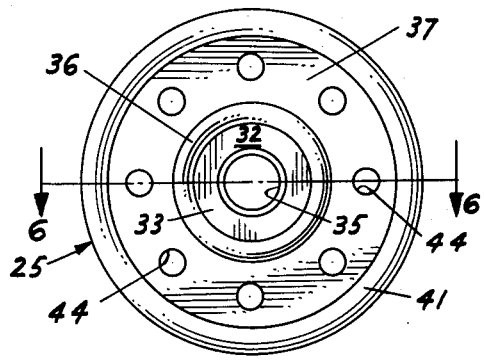
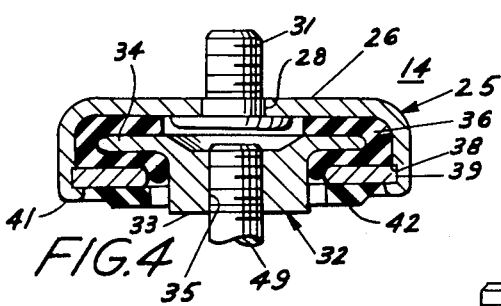
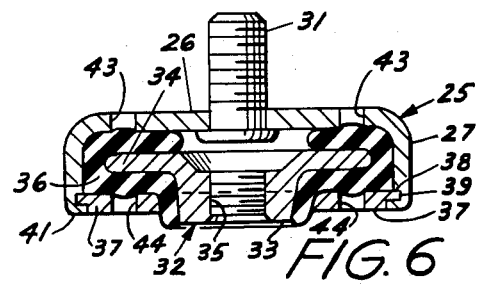
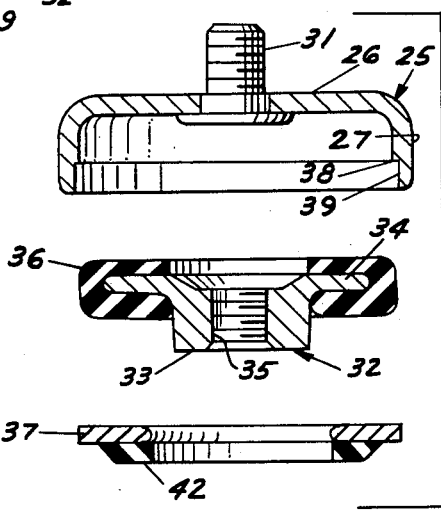

United States Patent Office 3,181,850
Patented May 4, 1965

3,181,850
VIBRATION ISOLATING DEVICE
Jacques Bajer, Grosse Pointe, Mich., assignor to Ford Motor Company, Dearborn, Mich., a corporation of Delaware
Filed Dec. 20, 1962, Ser. No. 246,100
4 Claims. (Cl. 267—1)

This invention relates to a vibration isolating device and more particularly to a vibration isolating device that may be employed in an automotive vehicle to provide vibration and noise isolation between automotive vehicle components, for example, between a steering gear and a structural member of the vehicle.

In modern day automotive vehicles it is essential that the vehicle components that produce vibrations and noise be effectively isolated from the passenger compartment and from the other components within the passenger compartment that come into contact with or are in the general area of the vehicle operator and passengers. This is especially true in luxury-type automotive vehicles where passengers and operators expect to have vibration free and noise free operation of the vehicle.

The present invention provides a means for isolating vibrations and noise between components of an automotive vehicle and is particularly adapted to be employed as a vibration isolating mounting between the steering gear of the vehicle and a frame or structural member thereof. Steering gears are commonly subject to vibrations emanating from road conditions. Shocks and vibrations are transmitted to the steering gear from the steerable road wheels of the vehicle through the steering linkage. In addition, there are audible noises generated within the steering gear due to steering gear movement and other mechanical phenomenon present in the operation of the steering gear. The vibration isolating device of the present invention is particularly designed to attenuate these vibrations and noises and to isolate them from the passengers and driver of the vehicle.

The vibration isolating device comprises a housing that is adapted to be attached to one of the vehicle components, for example, the steering gear. An insert is affixed to the other component of the motor vehicle, for example, a frame or support member. This insert has a peripheral flange or plate that is positioned within the housing. An elastomeric material envelops this peripheral plate and a pressure plate is positioned over this peripheral flange or plate and the elastomeric material. This pressure plate is subjected to a large force that compresses the elastomeric material to a predetermined extent and places it under a substantial predetermined compressive preload. The housing is then crimped over or otherwise suitably affixed to the pressure plate to maintain this preload.

The invention thus provides a very inexpensive and efficient device that includes an elastomeric material under substantial compressive preload for isolating vibrations between structural components of an automotive vehicle. It is a self-contained device that does not require cooperation with other structural members to provide the proper preload on the vibration isolating material employed, and the preload on this vibration isolating material is unaffected by the mounting of the device. In mounting the device of the invention the housing and the insert or other mounting means are rigidly affixed to the vehicle components that are to be coupled together by the vibration isolating device.

An object of the invention is the provision of a vibration isolating mount for structural components of an automotive vehicle.

Another object of the invention is the provision of a self-contained vibration isolating device for structural components of a motor vehicle that has the vibration isolating material subject to a substantial predetermined preload with this preload being substantially unaffected when the device is mounted in the vehicle.

A further object of the invention is the provision of a self-contained vibration isolating device for automotive vehicle components that may be readily inserted in place of other mounting mechanisms without changing or altering either of the components to which the mounting device is affixed.

Other advantages and objects of the invention will become more apparent as the specification is considered in connection with the attached drawings in which:

FIGURE 1 is a side elevational view showing the placement of the vibration isolating devices for isolating vibrations between a steering gear and a structural or frame member of the automotive vehicle;

FIGURE 2 is a sectional view taken along the lines 2—2 in FIGURE 1;

FIGURE 3 is a front elevational view of one embodiment of the vibration isolating device of the present invention taken along the lines 3—3 of FIGURE 2;

FIGURE 4 is a sectional view taken along the lines 4—4 of FIGURE 3;

FIGURE 5 is a front elevational view of another embodiment of the vibration isolating device of the present invention;

FIGURE 6 is a sectional view taken along the lines 6—6 of FIGURE 5, and

FIGURE 7 is an exploded view of the vibration isolating device of FIGURES 3 and 4 shown prior to assembly.

Referring now to FIGURES 1 and 2 of the drawings, the numeral 10 indicates a structural or frame member of the automotive vehicle. More specifically, FIGURE 1 shows a longitudinally extending side rail that supports a steerable road wheel 11 through suitable suspension means (not shown). The steering gear 13 is positioned adjacent the side rail and is coupled thereto by the vibration isolating devices of the invention, designated by the numerals 14. The output shaft 15 of the steering gear 13 is connected to the steerable road wheel 11 through conventional linkage 16. A steering column 17 extends upwardly from the steering gear 13 and it includes a steering shaft 18 that is connected to the input shaft of the steering gear 13. A steering wheel 21 is connected to the end of the steering shaft 18 opposite the steering gear 13.

One embodiment of the vibration isolating device 14 of this invention is shown in FIGURES 3 and 4 and an exploded view of this embodiment is shown in FIGURE 7. The device comprises a cup-shaped housing 25 having a main body part 26 that is substantially planar in configuration. The cup-shaped housing 25 also has a peripheral flange 27 that extends in a direction substantially perpendicularly to the planar main body part 26, and the planar main body part 26 has a central aperture 28 for receiving a threaded bolt 31. Means are provided to prevent relative rotation between the planar main body part 26 and the bolt 31. For example, serrations may be provided in the aperture 28 and on the bolt 31, or the aperture 28 may be substantially square in cross section with the bolt 31 having a complementary shape.

An insert 32 is provided for attaching or coupling the mount or device 14 to one of the vehicle components. This insert 32 comprises a boss 33 and a peripheral plate 34 that are preferably formed integrally. The plate 34 preferably extends in a plane that is substantially parallel to the planar main body part 26 of the cup-shaped housing 25, and that is perpendicular to the center line of the bolt 31 and a threaded aperture 35 that extends through the boss 33.

The peripheral plate 34 of the insert 32 is enveloped with an elastomeric material 36 preferably butyl rubber having high hysteresis characteristics. As can be seen be reference to FIGURES 4 and 7, this elastomeric material 36 is substantially U-shaped in cross section so that it receives and envelops the peripheral plate 34 of the insert 32. The elastomeric material 36 is preferably vulcanized or otherwise suitably bonded to the peripheral plate 34. Whether this is done depends on the loading to which the vibration isolating devices or mounts are subjected. Under high loading conditions it is preferable to provide the bond, while under low load conditions a bond would not be necessary.

In the construction of the vibration isolating device or mount 14 the cup-shaped housing 25 is suitably affixed in a jig or other firm mounting structure. The insert 32 with the elastomeric material 36 enveloping the peripheral plate 34 is positioned within the housing so that the elastomeric material 36 engages the planar main body 26 of the cup-shaped housing 25. An annular pressure plate 37 is then positioned over the elastomeric material 36 and the peripheral plate 34 of the insert 32. The pressure plate 34 is subjected to some predetermined load in order to preload the elastomeric material 36 in compression. The amount of this preload can be controlled easily by close dimensioning of the distance between the inner surface of the planar main body part 26 of the cup-shaped housing 25 and the shoulder 38 of a groove 39 that is positioned in the inner surface of the peripheral flange 27. For example, when the vibration isolating mount or device 14 is in the unassembled state as shown in FIGURE 7, the dimension taken through the peripheral plate 34 and the elastomeric material 36 in a direction perpendicular to the peripheral plate 34 is greater than the dimension between the shoulder 38 of the groove 39 and the inner surface of the planar main body 26 of the housing 25. When the force is applied to the pressure plate 37, the elastomeric material 36 will be subjected to a certain amount of compressive preload. This preload will be determined by the difference in the dimension between the shoulder 38 of the groove 39 and the inner surface of the planar main body 26 of the housing and the thickness as described previously through the peripheral plate 34 and the elastomeric material 36. When the pressure plate 37 is forced into the proper position so that it contacts the shoulder 38 of the groove 39, the housing is crimped over, as shown at 41 to secure the pressure plate 37 in position. This places a predetermined preload on the elastomeric material 36 that is essentially unaffected by forces that may be applied to the device in mounting it to the automobile components.

The vibration isolating device 14 is also provided with an annular elastomeric washer 42 that is bonded to the pressure plate 34 as can be appreciated by an inspection of FIGURE 2. This elastomeric washer 42 prevents the housing 25 of the device from coming into metal-to-metal contact, in the vicinity of the crimped over portion 41, with the vehicle components, for example, the frame or structural member 10.

The embodiment of the invention shown in FIGURES 5 and 6 is similar to that shown in FIGURES 4 and 5 except that the planar main body 26 of the cup-shaped housing 25 is provided with a plurality of apertures 43. The pressure plate 37 is also provided with a plurality of apertures 44 that are preferably located on a circle that has its center located at the center of the mounting device 14. It should be understood that the apertures 43 are also located on a circle, the center of which is the center of the mounting device 14. These apertures 43 and 44 provide expansion holes for the elastomeric material 36 as it is subjected to compressive forces during assembly operations. They also provide a convenient mechanism for handling the device and mounting it on the structural components of the vehicle. It can be easily understood that a spanner wrench can be employed to grip the cup-shaped housing 25 by inserting the wrench within the apertures 43. Similarly, a spanner wrench can be inserted into apertures 44 to grip the pressure plate 37. The elastomeric material 36 in this embodiment extends upwardly along the boss 33 and between the boss 33 and the pressure plate 37. As can be seen, it extends above the pressure plate 37 and will act as a means for preventing the pressure plate 37 and the cup-shaped housing 25 from engaging the structural member or frame 10 of the automotive vehicle should the vibration isolating device be subjected to inordinately high twisting loads.

The coupling of the vibration isolating device 14 to components of an automotive vehicle can be clearly seen by reference to FIGURE 2. In this figure the steering gear 13 is provided with a structural member 47 that includes a plurality of threaded bores 48. The bolts 31 are threaded into the bores and the vibration isolating devices 14 are securely tightened down against the mounting member 47. Bolts 49 are positioned through suitable cylindrical struts 51 in the frame or structural member 10 and are threaded into the threaded aperture 35 in the bosses 33 of inserts 32. See FIGURE 4 for a clear showing of the connection of a bolt 49 with the threaded aperture 35. These bolts are firmly tightened down and it can be appreciated that the vibration isolating devices 14 couple the steering gear 13 to the structural or frame member 10 through the elastomeric material 36. There is no direct path through metal-to-metal contact from the steering gear 13 to the structural or frame member 10. The elastomeric material 36 therefore isolates or attenuates vibrations that occur in the steering gear and it also attenuates any audible noises that occur in the steering gear.

The preload applied to the elastomeric material 36 is not affected by the amount of torque placed upon bolts 31 and 49 since the boss 33 of insert 32 engages the structure or frame member 10 and the main planar body 26 of the cup-shaped housing 26 engages the steering gear mounting member 47. The preload is determined solely by the amount of force needed to position the pressure plate 37 against the shoulder 38 of groove 39.

It can be appreciated from an inspection of FIGURE 2 that the vibration isolating devices may be readily employed with any steering gear or frame structure since they are self-contained units and need only be coupled by some suitable means to each of these components. Also, the vibration isolating devices may be employed to attenuate and isolate vibrations and audible noises between any two automotive vehicle components.

It will be understood that the invention is not to be limited to the exact construction shown and described, but that various changes and modifications may be made without departing from the spirit and scope of the invention as defined in the appended claims.

I claim:

1. A vibration isolating device for mounting a vehicle component that produces noise and vibration to a structural component of a vehicle comprising, a cup-shaped housing including a planar body and a peripheral flange, said cup-shaped housing being adapted to be affixed to one of said components, means adapted to be affixed to the other of said components, said means including a peripheral plate and an axially extending boss that extends beyond the peripheral flange of said cup-shaped housing and is adapted to engage the other of said components, said peripheral plate being positioned within said cup-shaped housing, an elastomeric material substantially enveloping said peripheral plate, and a pressure plate, said peripheral flange of said cup-shaped housing having a shoulder for receiving said pressure plate, the distance between said shoulder and said planar body being such that said elastomeric material is subjected to a predetermined preload, means on said housing for securing one face of said pressure plate against said shoulder, and an elastomeric washer secured to the other face of said pressure plate, said elastomeric washer having a thickness less than the distance between the peripheral flange of said cup-shaped housing and the other of said components, whereby said elastomeric washer is normally not in engagement with the other of said components, but will prevent the peripheral flange of said cup-shaped housing from engaging the other of said components when said vibration isolating device is subjected to high twisting loads.

2. A vibration isolating device for mounting a vehicle component that produces noise and vibration to a structural component of a vehicle comprising a cup-shaped housing having a planar body portion and a peripheral flange extending at substantially right angles to said planar body portion, said cup-shaped housing being adapted to be rigidly affixed to one of said components, means adapted to be rigidly affixed to the other of said components, said means comprising a plate having a peripheral planar portion positioned in a plane substantially parallel to the planar body portion of said cup-shaped housing, an elastomeric material of generally U-shaped cross section enveloping said peripheral planar portion of said plate, said peripheral flange of said cup-shaped housing having an internal surface, a shoulder formed on said internal surface, and a pressure plate having one face engaging said shoulder, the distance between said shoulder and the planar body portion of said cup-shaped housing being such that said elastomeric material is subjected to a predetermined preload, means engaging said housing and said pressure plate for securing said pressure plate against said shoulder, and an elastomeric washer bonded to the other face of said pressure plate to prevent said cup-shaped housing from coming into contact with said one of said components when said vibration isolating device is subjected to high twisting loads.

3. The vibration isolating device of claim 2 in which said elastomeric washer is bonded to the exposed surface of said pressure plate.

4. The vibration isolating device of claim 3 in which said cup-shaped housing and said pressure plate each have a plurality of apertures positioned therein, said apertures serving as expansion apertures for said elastomeric material and as a means for gripping said device by tools employed to couple the device to the vehicle components.

References Cited by the Examiner
UNITED STATES PATENTS

| 1,876,704 | 9/32 | Lipcot | 248—358 |
| 1,920,436 | 8/33 | Riker | 267—63 X |
| 2,079,798 | 5/37 | Geyer | 248—22 |
| 2,571,281 | 10/51 | Neher | 267—1 X |
| 2,683,007 | 7/54 | Iredell | 248—358 X |

ARTHUR L. LA POINT, *Primary Examiner.*